United States Patent
Barman et al.

(10) Patent No.: US 7,224,715 B1
(45) Date of Patent: May 29, 2007

(54) METHOD AND SYSTEM FOR MAXIMUM LIKELIHOOD CLOCK AND CARRIER RECOVERY IN A DIRECT SEQUENCE SPREAD SPECTRUM COMMUNICATION SYSTEM

(75) Inventors: Kaushik Barman, Andhra Pradesh (IN); Vellenki Umapathy Reddy, Andhra Pradesh (IN)

(73) Assignee: Hellosoft, Inc., San José, CA (US)

( * ) Notice: Subject to any disclaimer, the term of this patent is extended or adjusted under 35 U.S.C. 154(b) by 741 days.

(21) Appl. No.: 10/627,088

(22) Filed: Jul. 25, 2003

Related U.S. Application Data

(60) Provisional application No. 60/474,381, filed on May 30, 2003.

(51) Int. Cl.
*H04B 1/707* (2006.01)
*H04L 7/00* (2006.01)

(52) U.S. Cl. .............. 375/141; 375/147; 375/326; 375/354; 375/355

(58) Field of Classification Search ............ 375/145, 375/147, 149, 260, 262, 340, 341, 355, 335, 375/342, 140, 141, 326, 354; 714/794, 795; 370/335, 342
See application file for complete search history.

(56) References Cited

U.S. PATENT DOCUMENTS

| | | | |
|---|---|---|---|
| 5,187,719 A * | 2/1993 | Birgenheier et al. ........ 375/226 |
| 5,228,062 A * | 7/1993 | Bingham ................. 375/344 |
| 5,361,276 A | 11/1994 | Subramanian | |
| 6,005,889 A | 12/1999 | Chung et al. | |
| 6,621,857 B1 | 9/2003 | Belotserkovsky et al. | |

OTHER PUBLICATIONS

Kaushik Barman and Vellenki Umapathi Reddy, 'Maximun Likelihood Clock and Carrier Recovery in a Direct Sequence Spread Spectrum Communication System', pp. 322-325; 2002 IEEE International Conference on Personal Wireless Communications, held in New Delhi, India, on Dec. 15-17, 2002.

\* cited by examiner

*Primary Examiner*—Young T. Tse
(74) *Attorney, Agent, or Firm*—William L. Botjer

(57) ABSTRACT

The present invention provides a method and system for clock and carrier recovery in a direct sequence spread spectrum communication system. The process involves the receiver receiving a digital signal that has been transmitted by a remote transmitter. The method for joint clock and carrier recovery comprises the following steps. The received signal is down-converted and the signal is then converted to digital form. The signal is de-spread to obtain the phase of the signal constellation. The clock error at the receiver is then estimated from the phase error of the signal constellation by means of an optimal linear estimator. The discrete carrier frequency offset of the received signal is then estimated from the estimated clock error. The optimal linear estimator used here for estimating the clock error is also the maximum likelihood estimator.

6 Claims, 3 Drawing Sheets

METHOD AND SYSTEM FOR MAXIMUM LIKELIHOOD CLOCK AND CARRIER RECOVERY IN A DIRECT SEQUENCE SPREAD SPECTRUM COMMUNICATION SYSTEM

REFERENCE TO RELATED APPLICATIONS

This application claims the benefit of the priority of U.S. Provisional Application No. 60/474,381 filed May 30 2003.

BACKGROUND

The present invention discloses a method and system for clock and carrier recovery in a wireless communication system. More particularly, the present invention discloses a method and system for clock and carrier recovery in a direct sequence spread spectrum communication system.

In a typical wireless spread spectrum data communication system, the transmitter accepts a bit stream from a source and encodes it into a signal constellation point commonly known as a symbol. The signal constellation is a set of message points corresponding to the set of bits to be transmitted. The standard modulation techniques used for forming the symbol are Binary Phase Shift Keying (BPSK) and Quadrature Phase Shift Keying (QPSK). A sampled spreading sequence (for example a Barker Sequence) lasting over one symbol period is multiplied by the symbol to be transmitted to generate the samples of the signal to be transmitted in the baseband. The resulting samples are then fed to a Digital to Analog Converter (DAC) to generate the baseband analog signal. This analog signal is filtered to meet the required spectral mask and then fed to an up-converter, where a Radio Frequency (RF) carrier is modulated by the analog baseband signal. The output is then filtered and transmitted by means of an antenna. Clocks used for the DAC and the up-converter are derived from a common master clock to avoid non-coherency.

The signal is then transmitted through the channel and is received by the receiver. The signal is subjected to multipath, thermal noise, co-channel and adjacent channel interferences while traveling through the channel. The receiver, after receiving the waveform, reverses the processing done on the signal at the transmitter to get the original signal that was generated by the signal source. The process involves down-conversion of the received RF signal to the baseband and then sampling the baseband analog signal by an Analog to Digital Converter (ADC). The output from the ADC is fed to the baseband processing engine for recovering the bit stream from the received quantized samples. At the receiver also, the clocks for the ADC and the down-converter are derived from a common master oscillator for clock coherency. The received baseband signal has clock and carrier offsets as the transmit and receive clock sources are different. The transmit and receive clocks can vary independently around their nominal values. The clock variation is caused mainly by the crystal frequency drift, which is susceptible to ambient temperature fluctuation, aging and other imperfections. These variations lead to a clock error, which is the difference between the transmit and the receive clocks. This clock error is expressed in terms of a normalized sampling rate error between the transmitter and receiver. The receiver has to estimate and compensate for these offsets in order to successfully decode the bit stream.

As a result of the imperfections and inaccuracies mentioned above, there is an offset in the sampling rates of the transmitter DAC and the receiver ADC. Further, the imperfections in the local oscillators, used for up-conversion and down-conversion respectively, result in a carrier offset. The carrier offset, if left uncompensated, results in a continuous rotation in the signal constellation. This offset needs to be compensated for an error-free decision at the receiver. Thus, clock and carrier recovery is an essential process in the receiver. The receiver needs to estimate and track the clock error in the presence of the imperfections and the fluctuations mentioned in the previous paragraph.

In most of the data communication systems, a Phase Locked Loop (PLL) performs clock and carrier recovery. However, the PLL has its limitations. Traditionally used PLLs suffer from problems like lock-in and pull-in range limitations, and trade-offs between accuracy and convergence time. Analog PLLs also suffer from inflexibility and difficulty in implementation unlike the PLLs implemented in full software i.e. implementation using a Digital Signal Processor (DSP), or in digital hardware i.e. implementation using a Field Programmable Gate Array (FPGA) or an Application Specific Integrated Circuit (ASIC). Further, the performance accuracy of PLLs is limited by the precision of the analog devices used in the PLL, the device noise and the variation in the performance due to temperature fluctuations and aging. In addition to this, it is difficult to integrate PLLs with digital hardware for single chip implementation.

An all-digital carrier recovery is, therefore, much superior to the analog implementation. The performance of the digital implementation is also superior and more precise because its performance depends only on the noise in the input signal. Most of the schemes in all-digital implementation are based on a digital PLL having a Numerically Controlled Oscillator (NCO), digital loop filter and digital hardware to generate control signal for input to the NCO.

U.S. Pat. No. 5,361,276 entitled "All Digital Maximum Likelihood Based Spread Spectrum Receiver" granted to AT&T Bell Laboratories, NJ, USA filed on Sep. 13, 1993 discloses a spread spectrum receiver that uses a NCO to generate phase correction and overall frequency correction of the received signal. The receiver also comprises a digital frequency offset correction device for modifying the digital signal in accordance with a frequency correction term to correct the frequency offset in the received analog signal. In addition to this, WIPO Publication number 2001/50631A2 titled "Carrier Tracking Loop For Direct Sequence Spread Spectrum Systems" of Thomson Licensing S.A., France filed on Dec. 22, 2000 discloses a Carrier Tracking Loop (CTL) that is a phase error estimator for receiving the output symbol data. Further, a CTL phase error signal is generated based on the rotation of the spread-spectrum signal, and another CTL is used for generating the counter-rotating signal based on the CTL phase error signal.

Both the patents mentioned above use a NCO in their implementation. These are, therefore, digital translations of the analog counterpart of the PLL. Hence, these implementations also suffer from the traditional built-in problems with PLLs.

Some other methods that use Fast Fourier Transform (FFT) for carrier offset estimation and a frequency synthesizer for correction of LO (Local Oscillator) frequency have been proposed. European Patent number 892,528A2 titled "Carrier recovery for DSSS signals" granted to Nokia Mobile Phones Ltd., Espoo, Finland presents a device and a method for detection of direct sequence spread spectrum (DSSS) clocks using pseudo-random noise (PN) modulation when offsets are present in the carrier frequency. This is achieved by means of calculations using the Fast Fourier Transform (FFT).

The disadvantage of using the above-mentioned approach is that it is complex to implement and expensive in terms of the number of calculations needed. Thus, this scheme requires an expensive synthesizer with a fine enough frequency resolution to correct the carrier offset.

From the above discussion, it is apparent that there is a need for an all-digital scheme that is easy to implement and does not require extra digital hardware (such as the NCO, loop filter and the like). Further, the scheme should be easily implemented both in software (for example, using a digital signal processor) and in hardware (for example, using an FPGA or an ASIC). There is also a need for a system that is devoid of complex and expensive operations (like the FFT) and is efficient in correcting the carrier offset without disturbing the local oscillator.

SUMMARY

The present invention provides a method and system for joint clock and carrier recovery in a direct sequence spread spectrum (DSSS) communication system using a maximum likelihood estimator.

An objective of the present invention is to provide a linear estimator for both clock and carrier recovery in a DSSS communication system.

Another objective of the present invention is to provide a method and system for both clock and carrier recovery in a DSSS communication system that is suited for full digital implementation without needing additional hardware.

Another objective of the present invention is to provide a method and system for both clock and carrier recovery in a DSSS communication system that is computationally efficient and easy to implement.

Yet another objective of the present invention is to provide a method and system for correcting the carrier offset without disturbing the local oscillator.

To achieve the foregoing objectives, and in accordance with the purpose of the present invention as broadly described herein, the present invention provides a method and system for joint clock and carrier recovery in a direct sequence spread spectrum (DSSS) communication system using a maximum likelihood estimator. The method and the system use a pre-defined training sequence for this purpose. The pre-defined training sequence is first encoded into a Differential Binary Phase Shift Keying (DBPSK) symbol sequence and then spread using a spreading sequence. The spread symbol stream is then modulated onto a carrier frequency and is thereafter transmitted wirelessly over a channel. The stream is thereafter received by a receiver. The signal received at the receiver is down-converted to the baseband of the frequency spectrum and is sampled at a pre-defined sampling rate. Thereafter, the symbol boundary is estimated using the sampled signal. The maximum likelihood estimate of the mean of the phase error is then computed. This computation involves buffering the samples with symbol boundary alignment. The samples are then decimated and de-spread to form a differential symbol. The phase angle of this differential symbol is then extracted and a hard decision is performed on the phase angle. Thereafter, the phase error introduced in the transmitted symbols is calculated and accumulated using maximum likelihood weighting. These steps are performed L times, L being the estimation length in terms of the number of DBPSK symbols. This results in the maximum likelihood estimate of the mean of the phase error. After this, the maximum likelihood estimates of the carrier frequency offset and the clock error are computed.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides a method and system for joint clock and carrier recovery in a DSSS communication system using a maximum likelihood estimator.

In a DSSS communication system such as IEEE 802.11b based WLAN, an information bit sequence is first encoded into Differential Binary Phase Shift Keying (DBPSK) or Differential Quaternary Phase Shift Keying (DQPSK) symbols, which are then spread using a spreading sequence. The spreading is achieved by multiplying the symbol with a spreading sequence. The signal formed after the spreading is modulated onto a carrier frequency and then transmitted over-the-air.

Figure 1:
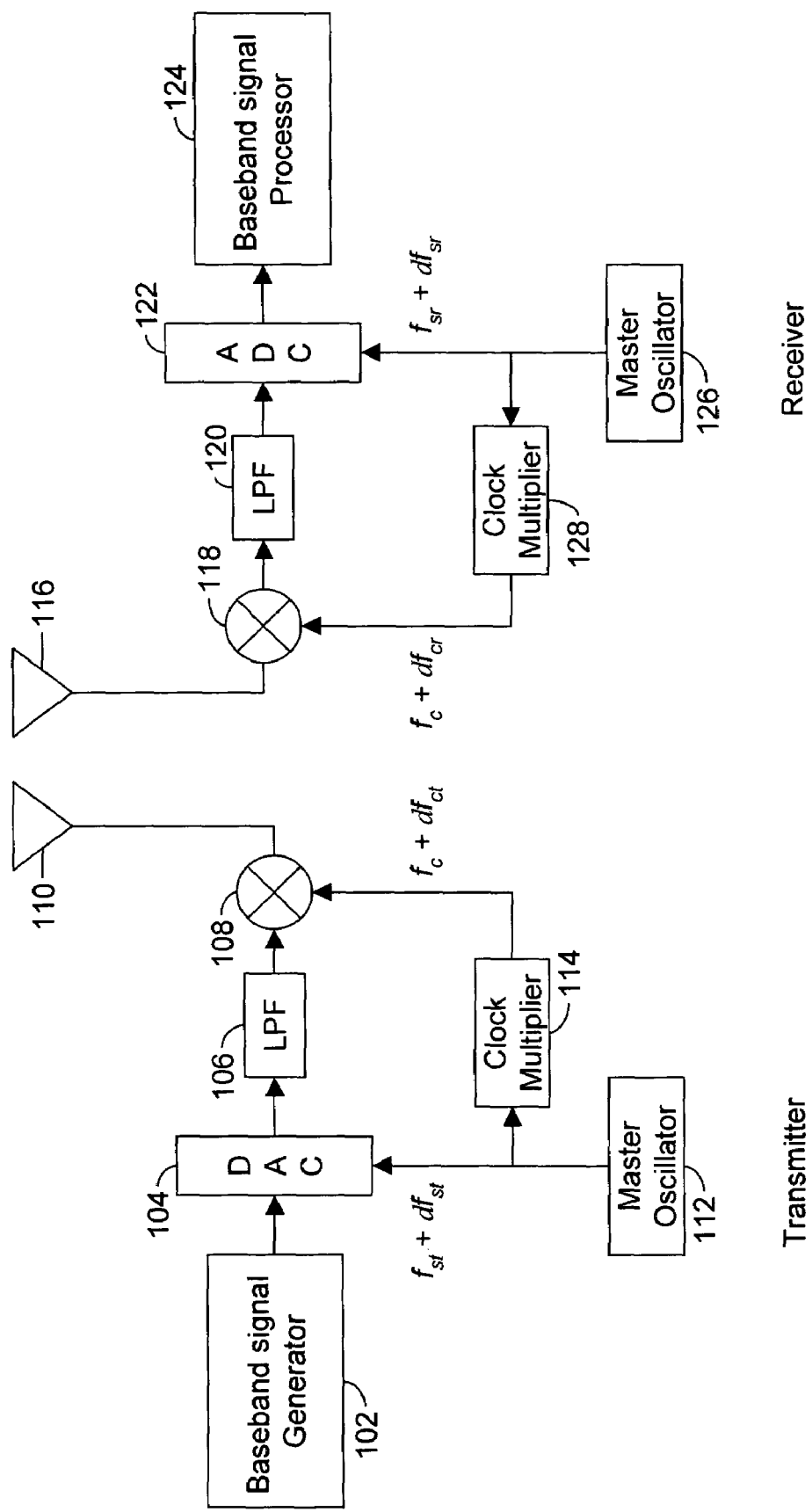
FIG. 1 is a block diagram of the basic elements in a typical transmitter and receiver of a Wireless Local Area Network (WLAN)

Referring now primarily to FIG. 1, the basic elements in a typical WLAN communication system will hereinafter be described. A baseband signal generator 102 generates a signal that needs to be transmitted. The transmitter modem, which is a part of baseband signal generator 102, generates samples of the signal and passes it through a Digital to Analog Converter (DAC) 104. DAC 104 has a sampling rate $f_{st}$ with an unknown error $df_{st}$. The signal is then passed through a Low Pass Filter (LPF) 106 to meet the required spectral mask. Thereafter, the signal is passed onto a multiplier 108 that is responsible for up-converting the baseband signal to carrier frequency $f_c$ with an unknown error $df_{ct}$. The signal at the output of multiplier 108 is then transmitted by a transmitter antenna 110. All the frequencies used at the transmitter are generated by a master oscillator 112. Further, the carrier frequency $f_c$ is generated by a clock multiplier 114, which also sources the clock from a master oscillator 112.

The transmitted signal is received by a receiving antenna 116 present at a remote receiver. The received signal is first down-converted from the carrier frequency by a multiplier 118 and an LPF 120. Multiplier 118 multiplies the received signal with a sine wave function that results in the conversion of the received signal into a signal containing a baseband component as well as a high frequency narrow band component. LPF 120 filters out the high frequency component so that only the baseband signal remains. The down-conversion frequency is $f_c$ with a carrier offset of $df_{cr}$. After this, the signal is sampled and converted to digital form by an Analog to Digital Converter (ADC) 122. ADC 122 has a sampling rate $f_{sr}$ with an unknown error $df_{sr}$. The resulting signal from ADC 122 is then processed by a baseband signal processor 124 for the purpose of demodulation and decoding. All the frequencies used at the receiver are generated by a master oscillator 126. Further, the carrier frequency $f_c$ (with the offset $df_{cr}$) is generated by a clock multiplier 128, which sources the clock from master oscillator 126.

The mismatch in the sampling rates of DAC 104 and ADC 122 arises due to the fact that master oscillator 112 at the transmitter and master oscillator 126 at the receiver use crystals that are non-coherent. Moreover, master oscillator frequencies vary independently around their nominal values. The variation is mainly caused by the crystal frequency drift, which is susceptible to ambient temperature fluctuation, aging and other imperfections. The difference in master oscillator 112 at the transmitter and master oscillator 126 at the receiver also gives rise to the mismatch in the upconversion and downconversion frequencies.

Thus, there is a mismatch between the sampling rate at the receiver and the sampling rate at the transmitter. Also, there is a mismatch between the carrier frequency used for downconversion at the receiver and the carrier frequency used for upconversion at the transmitter. Moreover, these mismatches vary with time around their nominal values. For effective demodulation and decoding of the received data in a WLAN system, these mismatches need to be rectified so that the transmitter and the receiver are synchronized.

In accordance with a preferred embodiment of the present invention, a pre-defined training sequence or unknown data sequence is transmitted to enable joint clock and carrier recovery in a WLAN system. Each bit of the known training sequence is first encoded into a DBPSK symbol that is then spread by a pre-defined spreading sequence, hereinafter referred to as the spreading sequence. The training sequence is used to make an estimation of the clock and carrier offsets. This is then tracked over the entire burst of the received signal. Let N denote the length of the spreading sequence. Thus, N is also the number of chips per symbol of the pre-defined training sequence, i.e. the spreading factor.

Figure 2A:
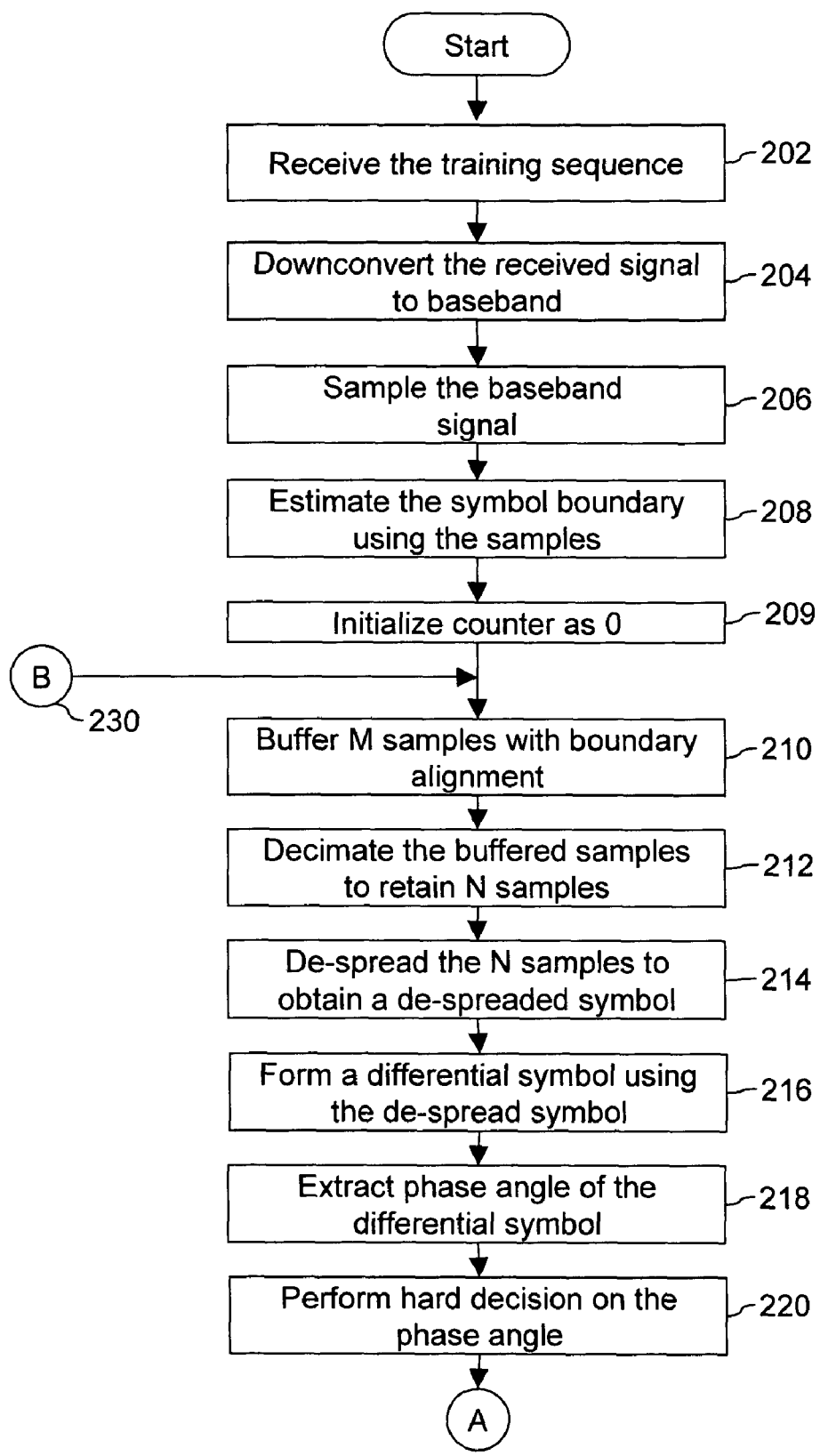
FIG. 2A and FIG. 2B are flowcharts of the method of clock and carrier recovery at the receiver of a Direct Sequence Spread Spectrum (DSSS) communication system in accordance with a preferred embodiment of the present invention.
Figure 2B:
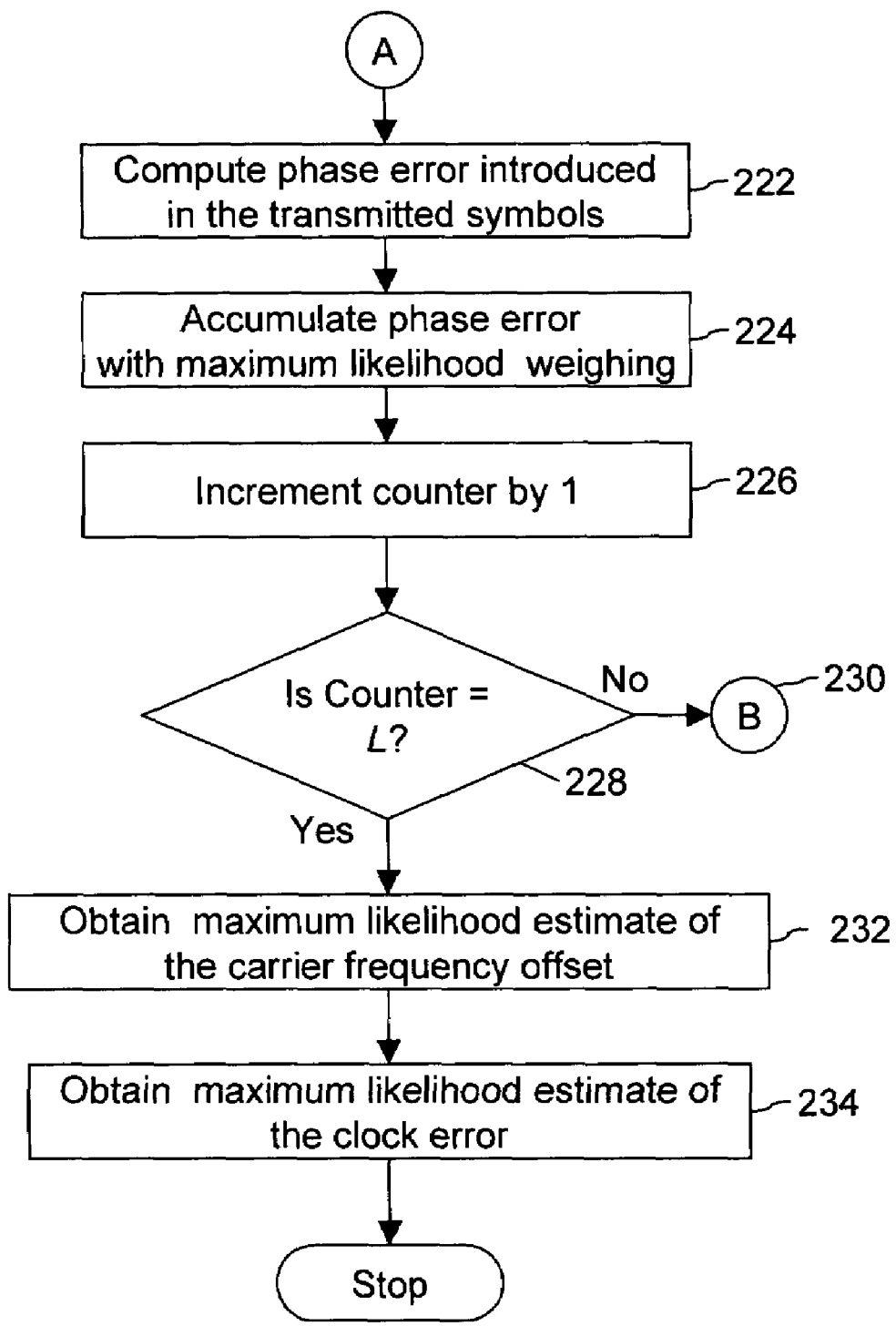

Referring now primarily to FIG. 2A and FIG. 2B, the method of estimation of the clock and carrier offset at the receiver in a DSSS communication system in accordance with a preferred embodiment of the present invention is hereinafter described. At step 202, a signal (hereinafter referred to as the received signal) corresponding to the transmitted training sequence is received by the receiver. Thereafter, at step 204, the received signal is downconverted to a baseband signal using multiplier 118 and LPF 120.

At step 206, the baseband signal is sampled by ADC 122 at a pre-defined sampling rate to obtain samples of received signal. Let M denote the number of samples per symbol. Thereafter, at step 208, a symbol boundary is estimated for the received signal using the samples obtained. A number of methods exist in the art for performing symbol boundary estimation. In a preferred embodiment of the present invention, the method described in the patent application titled 'A method of channel characterization in direct sequence spread spectrum based WLAN', filed on Apr. 23, 2003 as application Ser. No. 10/423,739, is used for symbol boundary estimation. In this method, a desired set of cross correlations, for a set of equally spaced time lags, is computed between the samples of the received signal and the spreading sequence. This set of cross correlations is used for channel characterization. The time lag corresponding to the highest magnitude cross correlation element in the selected set of cross correlations is the desired estimate of the symbol boundary.

Referring back to FIG. 2A and FIG. 2B, at step 209, a counter is initialized to zero. Thereafter, steps 210 to 228 are repeated L times, L being the estimation length in terms of the number of DBPSK symbols used for the estimation of the clock and carrier offsets.

Consider the $k^{th}$ iteration of steps 210 to 228. At step 210, M samples of the received signal are buffered with symbol boundary alignment, the M buffered samples covering a complete symbol duration. The first of the M samples is the sample at the time instant corresponding to the estimate of the symbol boundary obtained at step 208. Thereafter, at step 212, the buffered samples are decimated. In decimation, N samples out of a total of M samples are retained so that the N retained samples cover the complete symbol duration. Thereafter, at step 214, the N retained samples are de-spread using the pre-defined spreading code to obtain a de-spread symbol corresponding to the samples. The $k^{th}$ de-spread symbol is given by:

$$S_k = \sum_{n=0}^{N-1} y_{n,k} b_n \qquad (1)$$

where, $S_k$ denotes the $k^{th}$ de-spread symbol, $y_{n,k}$ denotes the $n^{th}$ sample from the N retained samples, the N retained samples corresponding to the $k^{th}$ symbol used in the estimation, and $b_n$ denotes the $n^{th}$ sample of the spreading sequence.

Referring back to FIG. 2A and FIG. 2B, the de-spread symbol $S_k$ is used at step 216 to form a differential symbol. The differential symbol is given by:

$$D_k = S_k S_{k-1}^* \qquad (2)$$

where, $S_{k-1}$ denotes the $(k-1)^{th}$ de-spread symbol, with $S_{-1}=1$, and

* denotes the complex conjugate operation.

At step 218, the phase angle of the differential symbol $D_k$ is extracted. This gives an estimate of the transmitted phase of the DBPSK symbol in $k^{th}$ symbol interval. Thereafter, at step 220, a differential angle, $d_k$, is extracted by performing a hard decision on the estimated phase. Then, at step 222, a phase error, $\phi_k$, introduced in the transmitted symbols is estimated. The phase error is given by:

$$\phi_k = \angle(D_k) - d_k \qquad (3)$$

where, $\angle(x)$ denotes the principal argument of the complex number x.

$d_k$ is known at the receiver prior, if the transmitted sequence is known. Otherwise, it is to be extracted from received data.

Thereafter, the current value of the phase error is accumulated at step 224 with the previously estimated phase errors, multiplying these errors with the maximum likelihood weights as given in (4).

$$W_k = \frac{6k(L-k)}{L(L^2-1)} \qquad (4)$$

where, k takes integer values from 0 to L−1, and

L denotes the estimation length.

The accumulated phase error can be represented as:

$$\Phi_k = W_k \phi_k + \Phi_{k-1} \qquad (5)$$

where $\Phi_k$ denotes the accumulated phase after k weighted phase error estimates, k takes integer values from 0 to L−1, and $\Phi_{-1}=0$.

After the accumulation of the phase error, the counter is incremented by 1 at step 226. Thereafter, at step 228, a check is made to ascertain whether the counter is equal to L. If the counter at step 228 is not equal to L, steps 210 to 228 are repeated, as shown with the help of connector 230.

If the counter at step 228 is equal to L, steps 210 to 228 are not repeated. Note that L values of the phase error, $\phi_k$, have been estimated by the L iterations of steps 210 to 226. Once these L values have been estimated and accumulated with weighting as above, the final result gives the maximum likelihood estimate, $m_\Phi^{ML}$, of the mean, $m_\phi$, of the phase error:

$$m_\Phi^{ML} = \Phi_{L-1} \quad (6)$$

Thereafter, the maximum likelihood estimate of the carrier frequency offset, $\Delta\omega_c^{ML}$, is computed at step 232 using $m_{101}^{ML}$. The relationship between $\Delta\omega_c^{ML}$ and $m_\Phi^{ML}$ is given by:

$$\Delta\omega_c^{ML} = \frac{m_\phi^{ML}}{N} \quad (7)$$

where, N is the number of samples per symbol.

Once $\Delta\omega_c^{ML}$ has been computed, the maximum likelihood estimate, $\Delta_{clock}^{ML}$, of the clock error at the receiver is computed at step 234 using the following equation:

$$\Delta_{clock}^{ML} = \frac{-f_{sr}}{2\pi f_c} \Delta\omega_c^{ML} \quad (8)$$

where, $f_c$ denotes the carrier frequency, and $f_{sr}$ denotes the receiver sampling frequency.

The method of maximum likelihood clock and carrier recovery in a direct sequence spread spectrum communication system according to the present invention is also disclosed in a research paper authored by the inventors of the present invention. The paper titled 'Maximum Likelihood Clock and Carrier Recovery in a Direct Sequence Spread Spectrum Communication System' was presented by Kaushik Barman and Vellenki Umapathi Reddy at the 2002 IEEE International Conference on Personal Wireless Communications, held in New Delhi, India, on Dec. 15–17, 2002. This paper is not admitted as effective prior art as the present patent application has been filed within one year of presenting the paper. In addition to disclosing the method according to the present invention, the paper also mathematically proves that the estimators according to the present invention are the maximum likelihood estimators for clock and carrier recovery. The method of maximum likelihood clock and carrier recovery as disclosed in the paper has been fully described herein.

One mode of reduction to practice of the preferred embodiment of the present invention is hereinafter described. A training sequence at 1 Mbps comprising 128 symbols is first encoded into DBPSK symbols that is then spread to a bandwidth of 11 MHz using a Barker sequence of length 11 resulting in N=11 chips per symbol. The received signal is sampled at a frequency of 44 MHz resulting in M=44 i.e. 44 samples per symbol. In an alternative mode of reduction to practice, the received signal is sampled at a frequency of 22 MHz resulting in M=22 i.e. 22 samples per symbol. It would be apparent to anyone skilled in the art that any other sampling frequency that is a multiple of 11 MHz and more than double the bandwidth may also be used.

The method of joint clock and carrier recovery provided by the present invention is implemented using re-programmable blocks such as Digital Signal Processors (DSPs). This implementation involves programming the DSPs using program codes that embody the method outlined in FIG. 2A and FIG. 2B. These program codes may be written in either DSP-specific assembly level language or a high-level language such as C. The embodiment of the present invention as a computer program product is used for joint clock and carrier recovery in a DSSS based communication system such as a WLAN. It can also be used for the simulation of a joint clock and carrier recovery system.

Alternatively, the method provided by the present invention may be implemented using digital logic in Field Programmable Gate Arrays (FPGAs) or in Application Specific Integrated Circuits (ASICs). An all-digital implementation is preferred due to the ease of re-programmability and upgradability of such an implementation.

The method provided by the present invention has a number of attractive features. First, the method is suitable for an all-digital implementation that does not require extra digital hardware (such as the Numerically Controlled Oscillator, the loop filter and the like). Second, the method is easily implemented both in software using a DSP and in hardware using an FPGA or an ASIC. Third, the method is efficient in correcting the carrier offset by de-rotating the ADC output samples digitally using estimated carrier offset, which does not involve any hardware to correct the local oscillator frequency.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

What is claimed is:

1. A method for clock and carrier recovery at a receiver of a direct sequence spread spectrum communication system, the clock and carrier recovery being accomplished using a predefined training sequence, each symbol of the predefined training sequence being spread by a predefined spreading sequence, the predefined training sequence being transmitted on a channel by a transmitter, a signal corresponding to the transmitted training sequence being received by the receiver, the method comprising the steps of:
   a. down-converting the received signal to convert it to a baseband signal;
   b. sampling the baseband signal at a predefined sampling rate to obtain samples of the baseband signal, wherein the sampled baseband signal comprises a plurality of symbols;
   c. estimating a symbol boundary using the samples of the baseband signal;
   d. computing a maximum likelihood estimate of a mean of phase errors using the samples of the baseband signal with the estimated symbol boundary;
   e. computing a maximum likelihood estimate of a carrier frequency offset using the maximum likelihood estimate of the mean of the phase errors; and f. computing a maximum likelihood estimate of a clock error using the maximum likelihood estimate of the carrier frequency offset.

2. The method as recited in claim 1, wherein the step of computing the maximum likelihood estimate of the mean of the phase errors comprises the steps of:
   i. setting a value of a counter to zero;
   ii. buffering M samples of the baseband signal with symbol boundary alignment, where M is a predefined number;
   iii. decimating to retain N samples of the M buffered samples, where N is length of the predefined spreading sequence;
   iv. de-spreading the decimated N samples of the M buffered samples using the predefined spreading sequence to obtain a de-spread symbols;
   v. forming a differential symbol using the de-spread symbols;
   vi. extracting a phase angle of the differential symbol;
   vii. performing a symbol decision on the phase angle to extract a differential angle;
   viii. computing a phase error introduced in the transmitted training sequence from the phase angle of the differential symbol and the differential angle;
   ix. accumulating the phase error;
   x. incrementing the value of the counter by unity; and
   xi. repeating steps ii–x until the value of the counter reaches a value L to obtain the maximum likelihood estimate of the mean of the phase errors, L being an estimation length in terms of a number of Differential Binary Phase Shift Keying symbols.

3. The method as recited in claim 2 wherein the step of accumulating the phase error comprises accumulating the phase error using a maximum likelihood weighting scheme.

4. A system for clock and carrier recovery at a receiver of a direct sequence spread spectrum communication system, the clock and carrier recovery being accomplished using a predefined training sequence, each symbol of the predefined training sequence being spread by a predefined spreading sequence, the predefined training sequence being transmitted on a channel by a transmitter, a signal corresponding to the transmitted training sequence being received by the receiver, the system comprising:
   a. a multiplier and Low Pass Filter (LPF) down-converting the received signal to a baseband signal;
   b. an Analog to Digital Converter (ADC) sampling the baseband signal at a predefined sampling rate to obtain samples of the baseband signal; and
   c. maximum likelihood estimator, the maximum likelihood estimator configured for estimating a symbol boundary using the samples of the baseband signal, computing a maximum likelihood estimate of a mean of phase errors using the samples of the baseband signal with the estimated symbol boundary, computing a maximum likelihood estimate of a carrier frequency offset using the maximum likelihood estimate of the mean of the phase errors, and computing a maximum likelihood estimate of a clock error using the maximum likelihood estimate of the carrier frequency.

5. A computer program product for clock and carrier recovery at a receiver of a direct sequence spread spectrum communication system, the clock and carrier recovery being accomplished using a predefined training sequence, each symbol of the predefined training sequence being spread by a predefined spreading sequence, the predefined training sequence being transmitted on a channel by a transmitter, a signal corresponding to the transmitted training sequence being received by the receiver, the computer program product being disposed on a computer readable medium and comprising:
   a. instruction means for down-converting the received signal to convert it to a baseband signal;
   b. instruction means for sampling the baseband signal at a predefined sampling rate to obtain samples of the baseband signal, wherein the sampled baseband signal comprises a plurality of symbols;
   c. instruction means for estimating a symbol boundary using the samples of the baseband signal;
   d. instruction means for computing a maximum likelihood estimate of a mean of phase errors using the samples of the baseband signal with the estimated symbol boundary;
   e. instruction means for computing a maximum likelihood estimate of a carrier frequency offset using the maximum likelihood estimate of the mean of the phase errors; and
   f. instruction means for computing a maximum likelihood estimate of a clock error using the maximum likelihood estimate of the carrier frequency offset.

6. The computer program product as recited in claim 5 wherein the instruction means for computing the maximum likelihood estimate of the mean of the phase errors comprises:
   i. instruction means for setting a value of a counter to zero;
   ii. instruction means for buffering M samples of the baseband signal with symbol boundary alignment, where M is a predefined number;
   iii. instruction means for decimating to retain N samples of the M buffered samples, where N is the length of the predefined spreading sequence;
   iv. instruction means for de-spreading the decimated N samples of the M buffered samples using the predefined spreading sequence to obtain a de-spread symbol;
   v. instruction means for forming a differential symbol using the de-spread symbol;
   vi. instruction means for extracting a phase angle of the differential symbol;
   vii. instruction means for performing a symbol decision on the phase angle to extract a differential angle;
   viii. instruction means for computing a phase error introduced in the transmitted training sequence from the phase angle of the differential symbol and the differential angle;
   ix. instruction means for accumulating the phase error using a maximum likelihood weighting scheme;
   x. instruction means for incrementing the value of the counter by unity; and
   xi. instruction means for repeating the instructions ii–x until the value of the counter reaches a value L to obtain the maximum likelihood estimate of the mean of the phase errors, L being an estimation length in terms of a number of Differential Binary Phase Shift Keying symbols.

* * * * *